US011334456B1

(12) United States Patent
Natanzon et al.

(10) Patent No.: US 11,334,456 B1
(45) Date of Patent: May 17, 2022

(54) SPACE EFFICIENT DATA PROTECTION (71) Applicant: EMC IP Holding Company LLC, Hopkinton, MA (US)

(72) Inventors: Assaf Natanzon, Tel Aviv (IL); Pengfei Wu, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 16/252,181

(22) Filed: Jan. 18, 2019

(51) Int. Cl.
*G06F 11/20* (2006.01)
*G06F 11/14* (2006.01)
*G06F 16/27* (2019.01)
*G06F 11/10* (2006.01)
*G06F 16/182* (2019.01)
*H04L 9/06* (2006.01)
*H03M 13/15* (2006.01)

(52) U.S. Cl.
CPC ...... *G06F 11/2094* (2013.01); *G06F 11/1004* (2013.01); *G06F 11/1451* (2013.01); *G06F 11/1464* (2013.01); *G06F 16/1824* (2019.01); *G06F 16/27* (2019.01); *H03M 13/154* (2013.01); *H04L 9/0637* (2013.01); *H04L 2209/38* (2013.01)

(58) Field of Classification Search
CPC .. G06F 11/2094; G06F 16/27; G06F 16/1824; G06F 11/1004; G06F 11/1451
USPC ........................................................ 707/626
See application file for complete search history.

(56) References Cited

U.S. PATENT DOCUMENTS

| 2013/0339818 | A1* | 12/2013 | Baker | H03M 13/356 714/763 |
|---|---|---|---|---|
| 2018/0189137 | A1* | 7/2018 | De Keyser | G06F 3/0604 |
| 2018/0217898 | A1* | 8/2018 | Tormasov | G06Q 20/10 |
| 2018/0246784 | A1* | 8/2018 | Nilsson | G06F 11/1076 |
| 2018/0248699 | A1* | 8/2018 | Andrade | H04L 63/105 |
| 2018/0343019 | A1* | 11/2018 | Xiang | H03M 13/1515 |

* cited by examiner

*Primary Examiner* — Hosain T Alam
*Assistant Examiner* — Nicholas E Allen
(74) *Attorney, Agent, or Firm* — Dergosits & Noah LLP; Todd A. Noah (57) ABSTRACT

A system identifies a data object, stored in a client, for replication. The system identifies a redundancy number associated with a protected amount of failed storage nodes. The system determines whether the total count of available storage nodes is at least two greater than the redundancy number. The system determines a distribution number that is at most the total count minus the redundancy number, in response to a determination that the total count of available storage nodes is at least two greater than the redundancy number. The system creates erasure code for the data object. The system allocates the distribution number of sections of a replica of the data object to a corresponding distribution number of available storage nodes and the redundancy number of sections of the erasure code to the redundancy number of available storage nodes, which excludes the corresponding distribution number of available storage nodes.

20 Claims, 5 Drawing Sheets

SPACE EFFICIENT DATA PROTECTION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

A data object and/or a backup file may be stored on cloud storage, which is a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computer service, a web service application programming interface (API), or by applications that utilize a web service API, such as cloud desktop storage, a cloud storage gateway, or Web-based content management systems.

While this disclosure uses backup files as examples, the procedures discussed apply to general data management operations. In the most general case of storing backup files in cloud storage, a typical backup/restore application reads data on a client system, optionally de-duplicates/compresses the backup data, catalogues the backup data, and sends the backup data to a cloud storage gateway, which exposes a file system interface backed by the cloud storage. Any data written to the file system interface exposed by the cloud storage gateway ends up getting written to the cloud storage. Often the cloud storage gateway is an intelligent device (like Maginatics or SteelStore) and has built-in de-duplication/compression capabilities.

DETAILED DESCRIPTION

The Internet of Things (IoT) is the network of devices, vehicles, and home appliances that contain electronics, software, actuators, and connectivity which allows these things to connect, interact, and exchange data. The Internet of Things involves extending Internet connectivity beyond standard devices, such as desktops, laptops, smartphones, and tablet computers, to any range of traditionally "dumb" or non-internet-enabled physical devices and everyday objects. Embedded with technology, these devices can communicate and interact over the Internet, and they can be remotely monitored and controlled.

Consequently, significantly large amounts of valuable data are generated, such that people and organizations buy or lease storage capacity from cloud storage providers to securely store replicas or backup files of user and organization data. These people and organizations often prefer data mobility to avoid becoming locked in with a single cloud storage provider. Therefore, a decentralized policy-driven back-end data protection system can provide true cloud-agnostic replication and protection policies with easy data mobility from one cloud storage provider to another cloud storage provider. Such an internet-scale decentralized data protection system is dynamic in nature because data-generating nodes and cloud storage nodes fail relatively often and are constantly joining and leaving the system. Due to this dynamic nature, there is a need for levels of protection against failure or unavailability of a large number of data-generating nodes and cloud storage nodes, which are uncommon levels of protection in standard storage systems.

A typical solution to maintain the availability of data is to have several full replicas or backup files of the data in the system. However, since large amounts of data are created, creating 3 or 4 replicas of each data object may require both the transfer and the storage of even larger amounts of data. For example, if a person requests the protection of a 4 megabyte (MB) data file against the possibility of 3 cloud storage node failures, a cloud storage provider could transfer and store replicas of the 4 MB data file to 4 cloud storage nodes, thereby resulting in the transfer of 16 MB of data and the filling of 16 MB of storage space just to provide the protected availability of 4 MB of data. Such a method of data transfer and storage is inefficient for data transfer and cloud node storage space, and this method can become too expensive for the people and organizations who use and protect their data.

Embodiments herein provide space efficient data protection. A system identifies a data object, which is stored in a client, for replication. The system identifies a redundancy number associated with a protected amount of failed storage nodes. If the total count of available storage nodes is at least two greater than the redundancy number, the system determines a distribution number that is at most the total count minus the redundancy number and creates erasure code for the data object. Then the system allocates the distribution number of sections of a replica of the data object to a corresponding distribution number of available storage nodes. The system allocates the redundancy number of sections of the erasure code to a corresponding redundancy number of available storage nodes, which excludes the corresponding distribution number of available storage nodes.

For example, a replicator identifies a 4 MB data file, which is stored in a connected car, for replication. The replicator identifies a redundancy number of three, which means that the data file needs to be protected against the failure of up to any three of a cloud's storage nodes. Since the replicator determines that seven (the number of the cloud's available storage nodes) is at least two greater than three (the protected number of failures for the cloud's storage nodes), the replicator calculates a distribution number of 4 (seven nodes minus three failures), which is implemented as 4 sections of a replica of the 4 MB data file, and creates 3 MB of erasure code for the 4 MB data file. Then the replicator uses the Inter-Planetary File System protocol to transmit a replica of the 4 MB data file to cloud storage in 16 chunks of 256 kb, allocating the 4 MB replica as four 1 MB replica sections of 4 chunks each, and then four cloud storage nodes' replicators store the four 1 MB replica sections of four chunks each into their four storage nodes, which are the cloud's first, second, third, and fourth storage nodes. The replicator uses the Inter-Planetary Fil System protocol to transmit the 3 MB of erasure code to cloud storage in 12 chunks of 256 kb, allocating the 3 MB of erasure code as three 1 MB erasure code sections of four chunks each, and then three cloud storage nodes' replicators store the three 1 MB erasure code sections of four chunks each into their three storage nodes, which are the cloud's fifth, sixth, and seventh storage nodes. If up to three of any of the cloud's seven storage nodes fail, the replicators can still recreate and restore the 4 MB data file, but only 7 MB (4 MB of the replica and 3 MB of erasure code) were transferred and only 7 MB (4 MB of the replica and 3 MB of erasure code) were stored. In contrast, the typical solution would create four full replicas of a 4 MB data file, transfer 16 MB of replicas, and store 16 MB of replicas to protect against the possibility of up to three storage node failures.

Figure 1A:
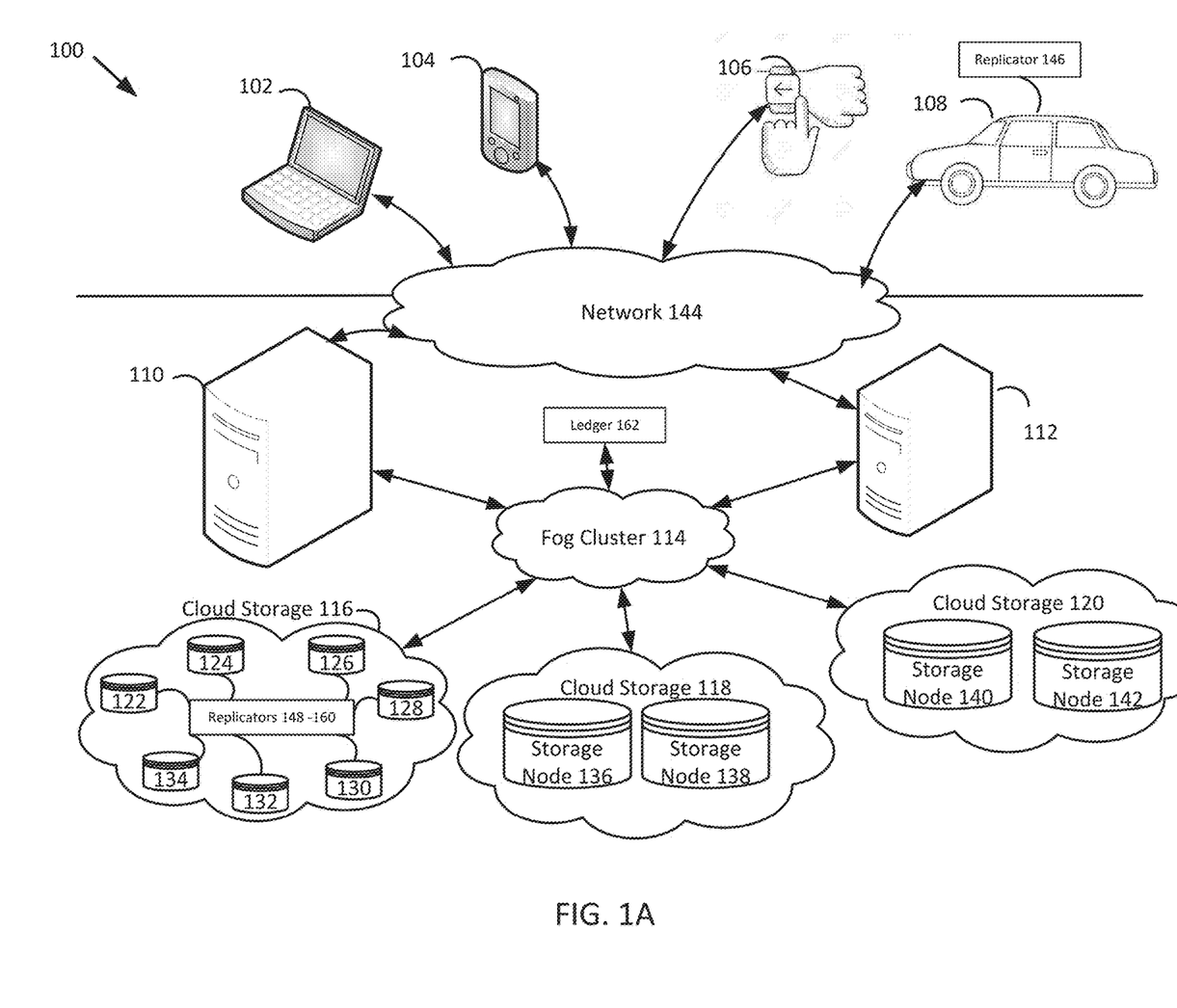
FIGS. 1A-B illustrate block diagrams of example systems for space efficient data protection, under an embodiment.
Figure 1B:
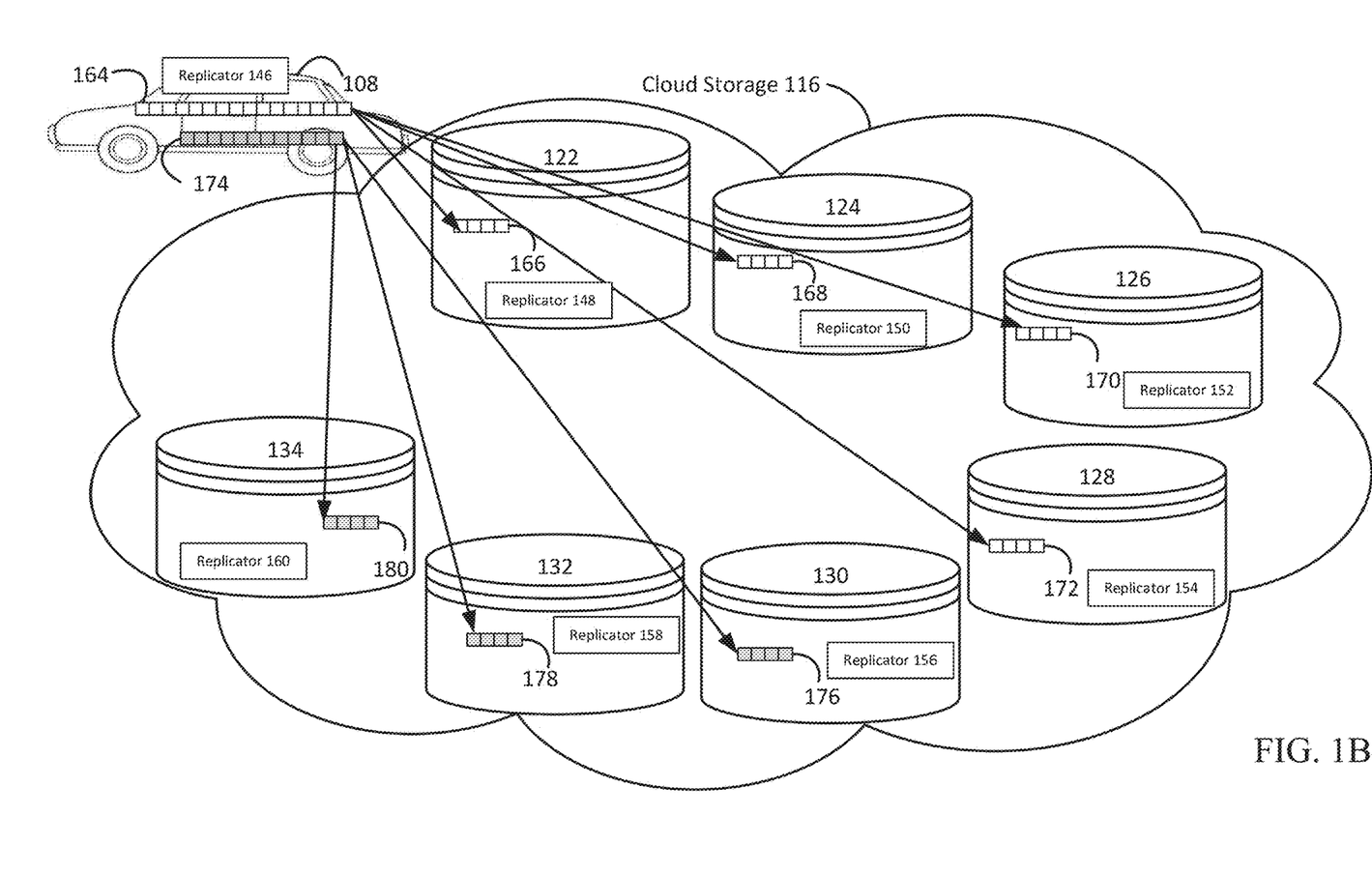

FIGS. 1A-B illustrate a diagram of a system for space efficient data protection, under an embodiment. As shown in FIG. 1A, a system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a first server 110, a second server 112, a fog cluster 114, a first cloud storage 116, a second cloud storage 118, and a third cloud storage 120, that may be provided by a hosting company. Although FIG. 1A depicts the first client 102 as a laptop computer 102, the second client 104 as a smart phone 104, the third client 106 as a smart watch 106, and the fourth client 108 as a connected car 108, each of the client engines 102-108 may be any type of computer, such as a server. The connected car 108 is a vehicle that is equipped with Internet access, and possibly also with a wireless local area network that allows the vehicle to share internet access and data with other devices both inside as well as outside the vehicle. The fog cluster 114 is an architecture that uses edge devices, such as routers, routing switches, integrated access devices, multiplexers, and a variety of metropolitan area network and wide area network access devices, to carry out a substantial amount of computation, storage, communication locally and routed over the Internet. The fog cluster 114 may be equated to a regional data center or a regional cloud storage, in contrast to a global data center or a global cloud storage.

The first cloud storage 116 includes a first storage node 122 through a seventh storage node 134, the second cloud storage 118 includes an eighth storage node 136 and a ninth storage node 138, and the third cloud storage 120 includes a tenth storage node 140 and an eleventh storage node 142. The clients 102-108 and the servers 110-112 communicate via a network 144. Although FIG. 1A depicts the system 100 with four clients 102-108, two servers 110-112, one fog cluster 114, three cloud storages 116-120, eleven storage nodes 122-142, and one network 144, the system 100 may include any number of clients 102-108, any number of servers 110-112, any number of fog clusters 114, any number of cloud storages 116-120, any number of storage devices 122-142, and any number of networks 144. The clients 102-108 and the servers 110-112 may each be substantially similar to the system 400 depicted in FIG. 4 and described below. Please note the storage can also be on the edge nodes, for example the data can be stored on multiple cars.

The connected car 108, includes a replicator 146, which may be referred to as the replication engine 146, that can generate a replication plan to create replicas of the data and the metadata of the connected car 108, and transmit the replicas to any of the other clients 102-106 and the storage nodes 122-142. The replicator 146 can also generate a restoration plan to execute a restoration based on the replicas. Although FIG. 1A depicts the replicator 146 residing on the connected car 108, each of the clients 102-108 may include its own dedicated replicator. Similarly, although FIG. 1A depicts the replicators 148-160 residing on the storage nodes 122-134, each of the storage nodes 136-142 may include its own dedicated replicator.

The replicators 146-160 can generate a replication plan, replicate a data object in accordance with the replication plan, record each of the replication steps in a ledger 162, and sign the entries in the ledger 162 such that each replication step is acknowledged. The ledger 162 may be a distributed ledger and/or a blockchain ledger. A blockchain is a growing list of records, called blocks, which are linked using cryptography, and may be implemented using any common blockchain technology, such as Hyperledger, Ethereum, and MultiChain. When used as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Therefore, the ledger 162 stores information about transactions that have occurred and transactions that are instructed to occur. For example, the replicator 146 publishes a protection policy to the ledger 162, specifying how a data object stored by the connected car 108 is to be protected. The replicators 146-160 can access the ledger 162 to confirm that the replication of data objects have been successfully instructed and performed, and then verify that the data objects are protected and replicated in accordance with the relevant policies.

The first server 110 and the second server 112 may be referred to as the cloud storage gateway 110 and the cloud storage gateway 112, each of which may be a network appliance or server which resides at a customer's premises, and which can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System Interface (iSCSI), Fibre Channel, and file-based interfaces such as Network File System (NFS) and Server Message Block (SMB), one version of which is also known as Common Internet File System (CIFS). A file system interface may be an API (application programming interface) through which a utility or user program requests the storing and retrieving of data. The cloud storage gateway 110 and the cloud storage gateway 112 can each serve as an intermediary to multiple cloud storage providers. The first cloud storage 116 may be a Google® cloud platform, the second cloud storage 118 may be an Amazon Web Services® cloud platform, and the third cloud storage 120 may be a Microsoft® Azure cloud platform.

The system identifies a data object, which is stored in a client, for replication. For example, after the connected car 108 generates a data file that reflects a route driven, the times of day for each route segment, and each speed driven during the route, the replicator 146 identifies the 4 MB data file, which is stored in the connected car 108, for replication. The replicator 146 is unable to anticipate when the connected car 108 will no longer be connected, such as when the connected car 108 is turned off or is driving through a low connectivity area, such as a long tunnel. Therefore, the replicator 146 may identify the 4 MB data file for replication prior to the completion of a route so that the replicator 146 will be able to transfer a replica of the 4 MB data file for storage prior to the loss of connectivity. A data object can be a collection or a group of information that is backed up as a unit, such as the information for a computer or a network of computers. A client can be an electronic device that is capable of obtaining information from another electronic device.

After identifying the data object for replication, the system identifies a redundancy number associated with a protected amount of failed storage nodes. For example, the replicator 146 identifies a policy for the connected car 108 that specifies a redundancy number of three, which means that the 4 MB data file needs to be protected against the failure of up to any three of a cloud's storage nodes. A redundancy number can be an arithmetical value that represents a protected level of failure. A protected amount can be a quantity of something, typically the total of a thing or things in number, for which preparations have been made. A failed storage node can be a piece of equipment that retains retrievable data and that is not functioning properly.

Having identified the specified redundancy number for a specific data object, the system determines the total count of available storage nodes. For example, the replicator 146 communicates with the cloud storage 116 via the network 144, the cloud storage gateway 112, and the fog cluster 114, and determines that the connected car 108 has a license to store a replica of the 4 MB data file on any of seven available storage nodes 122-134. Then the system determines whether the total count of available storage nodes is enough to independently store more than the redundancy number of sections of the replica. For example, the replicator 146 determines whether seven (the number of the cloud storage 116's available storage nodes 122-134) is at least two greater than three (the redundancy number of three for the sections of the replica). A total count can be the entire amount. An available storage node can be a piece of equipment that retains retrievable data and that is currently able to be used.

If the total count of available storage nodes is not at least two greater than the number of storage nodes required to independently store the redundancy number of sections of the replica, then the system stores at least the total count of replicas of the data object in the total count of available storage nodes. For example, the replicator 146 stores three replicas of the 4 MB data file into the three storage nodes 122-126, which in this scenario are the only available storage nodes in the cloud storage 116.

If the total count of available storage nodes is at least two greater than the number of storage nodes required to independently store the redundancy number of sections of the replica, then the system determines a distribution number that is at most the total count minus the redundancy number. For example, since the replicator 146 determines that seven (the number of the cloud storage 116's available storage nodes 122-134) is at least two greater than three (the redundancy number of three for sections of the replica) the replicator 146 calculates a distribution number of 4 (seven nodes minus three failures) for implementation as 4 sections of a replica of the 4 MB data file. Therefore, the replicator 146 uses the Inter-Planetary File System protocol to transmit a replica of the 4 MB file system, which divides each transmitted file into chunks of 256 kilobytes (KB), and allocates the replica of the 4 MB data file 164 as four 1 MB replica sections 166-172, with each section comprised of 4 chunks of 256 KB, as depicted by FIG. 1B. If N is the size of the data file, K is the redundancy number, and M is the total count of available storage nodes, then the storage space to be occupied on the available storage nodes can be calculated by the formula: $N*M/(M-K)$. For example, if N=4 MB, K=3, and M=7, then $4 \text{ MB}*7/(7-3)=28/4=7$ MB, which is to be stored on 7 storage nodes, which means that each of the 7 storage nodes will store 1 MB. Therefore, the replicator 146 creates a replication plan to allocate a replica of the 4 MB data file 164 as four 1 MB replica sections 166-172, to create 3 MB of erasure code 174, and to allocate the 3 MB of erasure code 174 as three 1 MB erasure code sections 176-180, which will result in the replicators 148-160 pinning these sections 166-172 and 176-180 to their cloud storage nodes 122-134.

Having calculated the distribution number of sections for a replica of the data object, the system creates erasure code for the data object, and optionally stores the erasure code on the client. For example, the replicator 146 creates 3 MB of erasure code 174 for the 4 MB data file 164, and then stores the 3 MB of erasure code 174 on the connected car 108, as depicted by FIG. 1B. Since the erasure code is created on the client that stores the data file, the system can save space on the client by the ad hoc creation of the erasure code, by creating the erasure code as virtual chunks right before the erasure code needs to be allocated as sections to be stored on storage nodes. Although this example describes a ratio of 3 MB of erasure code to 4 MB of the backup file, other ratios can be used. Erasure code can be a technique used for controlling errors in data transmission, under the assumption of bit erasures (rather than bit errors), which transforms a message of k symbols into a message with n symbols such that the original message can be recovered from a subset of the n symbols.

Following the creation of erasure code, the system allocates the distribution number of sections of the replica to a corresponding distribution number of available storage nodes. For example, the replicator 146 communicates with the cloud storage 116 via the network 144, the cloud storage gateway 112, and the fog cluster 114, and uses the Inter-Planetary File System protocol to transmit a replica of the 4 MB data file 164 to the cloud storage 116 in 16 chunks of 256 kb, allocating the 4 MB replica as the four 1 MB replica sections 166-172 of 4 chunks each to the four replicators 148-154, which pin the four 1 MB replica sections 166-172 of four chunks each to the four storage nodes 122-128, which are the cloud storage 116's first, second, third, and fourth storage nodes, as depicted by FIG. 1B. Instead of having to divide the replica 164 into sections to be stored separately, the replicator 146 leverages the existing chunking process of the Inter-Planetary File System protocol to allocate the required number of chunks to their corresponding storage nodes.

Examples in this disclosure describe the system allocating sections of a data file's replica for storage, which can be subsequently recombined to restore the data file. However, the system can divide the data file into data file sections before allocating replicas of the data file sections, and subsequently recombine the replica sections to recreate the data file sections, which would be recombined to form the data file. The system 100 can use the Inter-Planetary File System (IPFS) protocol to transfer and store data objects. In contrast to Hyper Text Transfer Protocol (HTTP), which typically downloads a data object from a single source, the Inter-Planetary File System can retrieve sections of a data object from multiple sources at the same time. Although this example describes using the Inter-Planetary File System protocol and 256 kb chunks, other file system protocols and other chunk sizes can be used. A replica can be the information needed to restore a data object to a state at a specific time when the information was recorded. A section can be any of the more or less distinct parts into which something is or may be divided, or from which the thing is made up.

After allocating sections of the replica, the system can allocate the redundancy number of sections of the erasure code to a corresponding redundancy number of sections of available storage nodes, which exclude the distribution number of available storage nodes. For example, the replicator 146 communicates with the cloud storage 116 via the network 144, the cloud storage gateway 112, and the fog cluster 114, and uses the Inter-Planetary File System protocol to transmit the erasure code 174 to the cloud storage 116 in 12 chunks of 256 kb, allocating the three 1 MB erasure code sections 176-180 of four chunks each to the replicators 156-160 which pin the three 1 MB erasure code sections 176-180 of four chunks each to three storage nodes 130-136, which are the cloud storage 116's fifth, sixth, and seventh storage nodes, as depicted by FIG. 1B. Instead of having to divide the erasure code 174 into sections to be stored separately, the replicator 146 leverages the existing chunking process of the Inter-Planetary File System protocol to allocate the required number of chunks to their corresponding storage nodes.

If a storage node that stores a section of a replica or a section of erasure code subsequently fails, the system can recreate the unavailable section and store this section to another storage node. For example, the replicators 148-160 monitor the availability of the storage nodes 122-134, identify the failure of the storage node 134 that stored the third section of the erasure code 180, use the four 1 MB sections 166-172 stored on the storage nodes 122-128 to recreate the third section of the erasure code 180, and then store the third section of the erasure code 180 in an additional storage node, which is not depicted in FIG. 1A or B. The replicators 148-160 use metadata provided by the storage nodes 122-134 that store a section of a replica or erasure code to identify the sections stored by storage nodes, which enable the identification of the storage nodes required for the recreation of an unavailable section. Since such a recreation of an unavailable section can be relatively expensive for system resources, the system may originally create a higher redundancy level than required, such that a recreation of an unavailable section would occur only after multiple storage node failures.

Upon receipt of a restoration request, the system can access the storage nodes that store the sections of the replica and/or the sections of the erasure code, and then restore the requested data file. For example, the replicator 146 receives a request to restore the 4 MB data file for the connected car 108, identifies that the storage node 122 that stored the first section 166 of the replica has failed, and uses the last three sections of the replicas 150-154 stored in the storage nodes 124-128 and the first section 176 of the erasure code stored in the storage node 130 to recreate and restore the 4 MB data file for the connected car 108. The replicator 146 uses metadata provided by the storage nodes 122-134 that store a section of a replica or erasure code to identify the sections stored by storage nodes, which enable the identification of the storage nodes required for the restoration of a data file. A request can be an instruction to a computer, such as an instruction to return a data object to its former condition.

Figure 2:
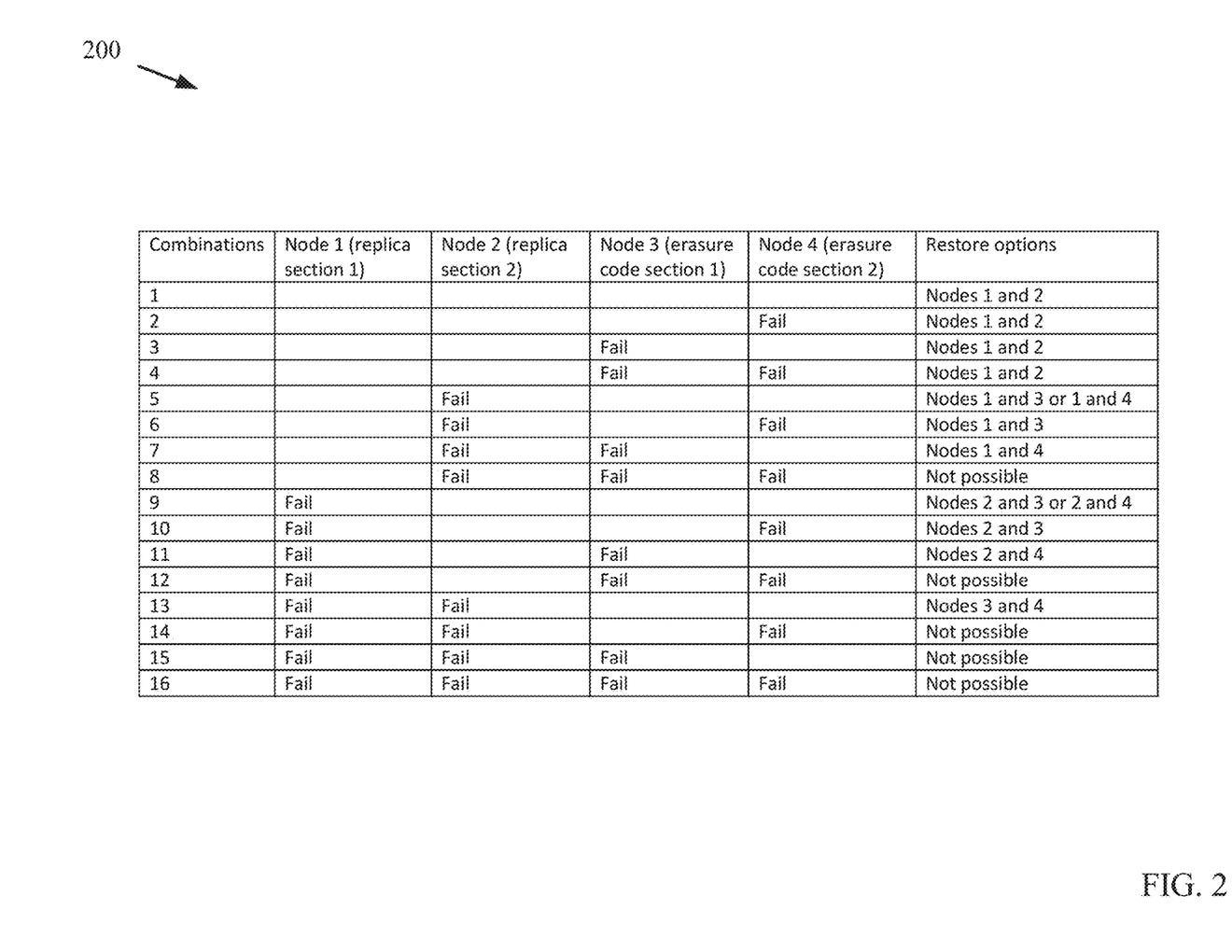
FIG. 2 is a table that illustrates combinations of storage node failures and restore options for space efficient data protection, under an embodiment.

In this example, if up to three of any of the cloud storage 116's seven storage nodes 122-134 fail, the replicator 146 can still recreate and/or restore the 4 MB data file, but only 7 MB (4 MB of replicas and 3 MB of erasure code) were transferred to the storage nodes 122-134 and only 7 MB (4 MB of replicas and 3 MB of erasure code) were stored in the storage nodes 122-134. In contrast, the typical solution would create four full replicas of the 4 MB data file 164, transfer 16 MB of replicas to the storage nodes 122-128, and store 16 MB of replicas in the storage nodes 122-128 to protect against the possibility of up to three storage node failures. Although this example described more than a 50% reduction in the transfer and storage of data, other levels of reductions are possible FIG. 2 is a table 200 that illustrates combinations of storage node failures and restore options for space efficient data protection. Whereas the total number of possible combinations of the seven storage nodes 122-134 failing is 128, the simplified example depicted by FIG. 2 is based on 16 possible combinations of four storage nodes failing, which include two nodes (nodes 1 and 2) that store sections of a replica and two nodes (nodes 3 and 4) that store sections of erasure code. For example, combination 9 specifies that if node 1 fails and node 1 stores section 1 of the replica, the system can restore the data file protected by the replica by using a combination of section 2 of the replica stored in node 2 and either section 1 of the erasure code stored in node 3 or section 2 of the erasure code stored in node 4. As table 200 indicates, restoration is possible for any combination of 0 storage node failures, 1 storage node failure, and 2 storage node failures, such that 4 storage nodes storing sections of a replica or erasure code is sufficient to protect against up to any 2 storage node failures. Restoration is not possible only when 3 or 4 of the 4 storage nodes fail.

Figure 3:
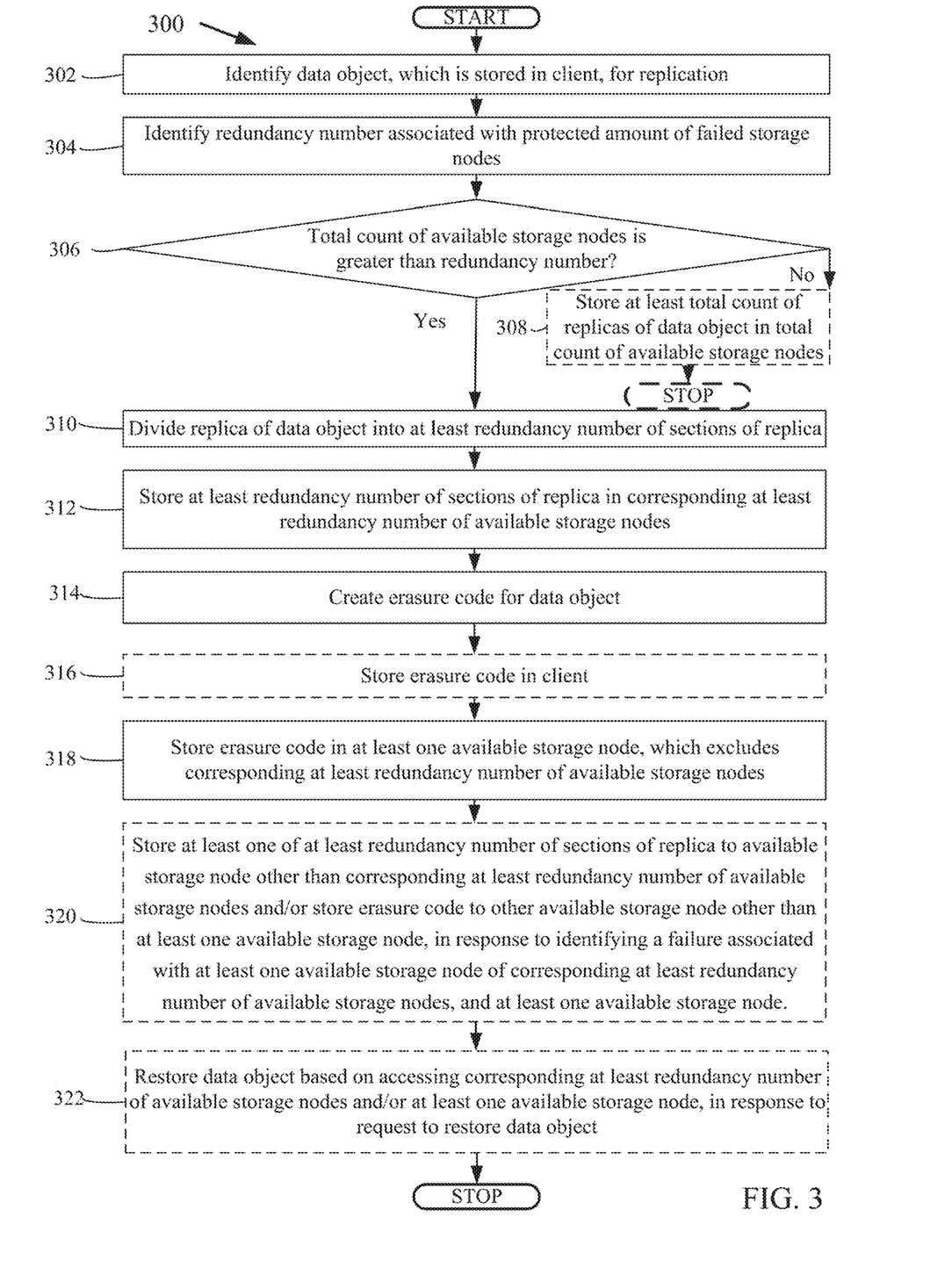
FIG. 3 is a flowchart that illustrates a method for space efficient data protection, under an embodiment.

FIG. 3 is a flowchart that illustrates a method for space efficient data protection, under an embodiment. Flowchart 300 illustrates method acts illustrated as flowchart blocks for certain steps involved in and/or between the clients 102-108 and/or the servers 110-112 of FIG. 1A.

A data object that is stored in a client is identified for replication, block 302. The system identifies a client's data for replication. For example, and without limitation, this can include the replicator 146 identifying a 4 MB data file that is stored in the connected car 108 for replication.

After identifying a client's data for replication, a redundancy number is identified, which is associated with a protected amount of failed storage nodes, block 304. The system identifies the protection level required for a specified number of storage node failures. By way of example and without limitation, this can include the replicator 146 identifying a redundancy number of three, which means that the connected car 108's data needs to be protected against the failure of up to any three of a cloud's storage nodes.

Following the identification of the redundancy number, a determination is made whether the total count of available storage nodes is at least two greater than the redundancy number, block 306. The system determines whether the number of available cloud storage nodes is at least two greater than the number of storage nodes to independently store enough sections of a replica of the protected data object. In embodiments, this can include the replicator 146 determining whether the number of available storage nodes 122-134, which is seven, is at least two greater than the redundancy number of three. If the total count of available storage nodes is not at least two greater than the redundancy number, the method 300 continues to block 308 to store multiple full replicas in the limited number of available storage nodes. If the total count of available storage nodes is at least two greater than the redundancy number, the method 300 proceeds to block 310 to calculate a distribution number for sections of a replica of the data object.

If the total count of available storage nodes is not at least two greater than the redundancy number, then the system stores the total count of replicas of the data object in the total count of available storage nodes, block 308. The system stores full replicas of the data file if the number of available storage nodes is insufficient for storing enough sections of the replica of the data object to be protected. For example, and without limitation, this can include the replicator 146 using the Inter-Planetary File System protocol to transfer three replicas of the data file 164 to the replicators 148-152, which store the three replicas of the data file 164 into their three storage nodes 122-126, which in this scenario are the only available storage nodes in the cloud storage 116. Then the method 300 terminates, to be ready for the next data file that is identified for replication.

If the total count of available storage nodes is at least two greater than the redundancy number, then the system determines a distribution number that is at most the total count minus the redundancy number, block 310. The system calculates the number of sections of the replica of the data object. By way of example and without limitation, since seven (the number of the cloud storage 116's available storage nodes 122-134) is at least two greater than three (the redundancy number of three), this can include the replicator 146 calculating a distribution number of 4 (seven nodes minus three failures) for 4 sections of a replica of the 4 MB data file.

Having calculated the distribution number of sections for the replica erasure code is created for the data object, block 312. The system creates erasure code for the data file, which can be used to recreate the data file. In embodiments, this can include the replicator 146 creating 3 MB of erasure code 174 for the 4 MB data file 164.

After creating the erasure code for the data object, the erasure code is optionally stored in the client, block 314. The system can store erasure code in the client, which can be used to recreate the data file. For example, and without limitation, this can include the replicator 146 storing the 3 MB of erasure code 174 in the connected car 108.

Following the creation of the erasure code, the distribution number of sections of the replica are allocated to the corresponding distribution number of available storage nodes, block 316. The system allocates sections of the replica to some available storage nodes. By way of example and without limitation, this can include the replicator 146 using the Inter-Planetary Fil System protocol to transmit a replica of the 4 MB data file 164 to the cloud storage 116 in 16 chunks of 256 kb, allocating the 4 MB replica as four 1 MB replica sections 166-172 of 4 chunks each to the four cloud storage nodes' replicators 148-154, which pin the four 1 MB replica sections 166-172 of four chunks each to their four storage nodes 122-128, which are the cloud storage 116's first, second, third and fourth storage nodes.

Having allocated sections of the replica to available storage nodes, the redundancy number of sections of the erasure code is allocated to the corresponding redundancy number of available storage nodes, which excludes the corresponding distribution number of available storage nodes, block 318. The system distributes sections of the erasure code in the remaining storage nodes. In embodiments, this can include the replicator 146 using the Inter-Planetary File System protocol to transmit the erasure code 174 to the cloud storage 116 in 12 chunks of 256 kb, allocating the three 1 MB erasure code sections 176-180 of four chunks each to the replicators 156-160, which pin the three 1 MB erasure code sections 176-180 of four chunks each to their three storage nodes 130-136, which are the cloud storage 116's fifth, sixth, and seventh storage nodes.

After storing sections of the replica and the erasure code in the available storage nodes, at least one of the distribution number of sections of the replica are optionally stored to an available storage node other than the corresponding distribution number of available storage nodes, and/or the redundancy number of sections of the erasure code is optionally stored to an available storage node other than the redundancy number of available storage nodes, in response to identifying a failure associated with at least one available storage node of the corresponding distribution number of available storage nodes and the corresponding redundancy number of available storage nodes, block 320. If a storage node that stores a section of a replica or erasure code subsequently fails, the system can recreate and store the section of the replica or erasure code in another storage node. For example, and without limitation, this can include the replicators 148-160 identifying the failure of the storage node 134 that stored the third section 180 of the erasure code, using the four 1 MB sections 166-172 stored on the storage nodes 122-128 to recreate the third section 180 of the erasure code, and then storing the third section 180 of the erasure code in an additional storage node, which is not depicted in FIG. 1A or B.

Following the storing of sections of the replica and the erasure code in the available storage nodes, the data object is optionally restored based on accessing the corresponding distribution number of available storage nodes, and/or the corresponding redundancy number of available storage nodes, in response to a request to restore the data object, block 322. The system can use the sections of the replica and/or the erasure code stored in the storage nodes to restore the data file. By way of example and without limitation, this can include the replicator 146 receiving a request to restore the data file for the connected car 108, communicating with the replicators 148-160, which identifies that the storage node 122 that stored the first section 166 of the replica has failed, and the replicators 148-160 using the last three sections 168-172 of the replica stored in the storage nodes 124-128 and the first section 176 of the erasure code stored in the storage node 130 to recreate the data file, which enables the replicator 146 to restore the data file for the connected car 108.

Although FIG. 3 depicts the blocks 302-322 occurring in a specific order, the blocks 302-322 may occur in another order. In other implementations, each of the blocks 302-322 may also be executed in combination with other blocks and/or some blocks may be divided into a different set of blocks.

Figure 4:
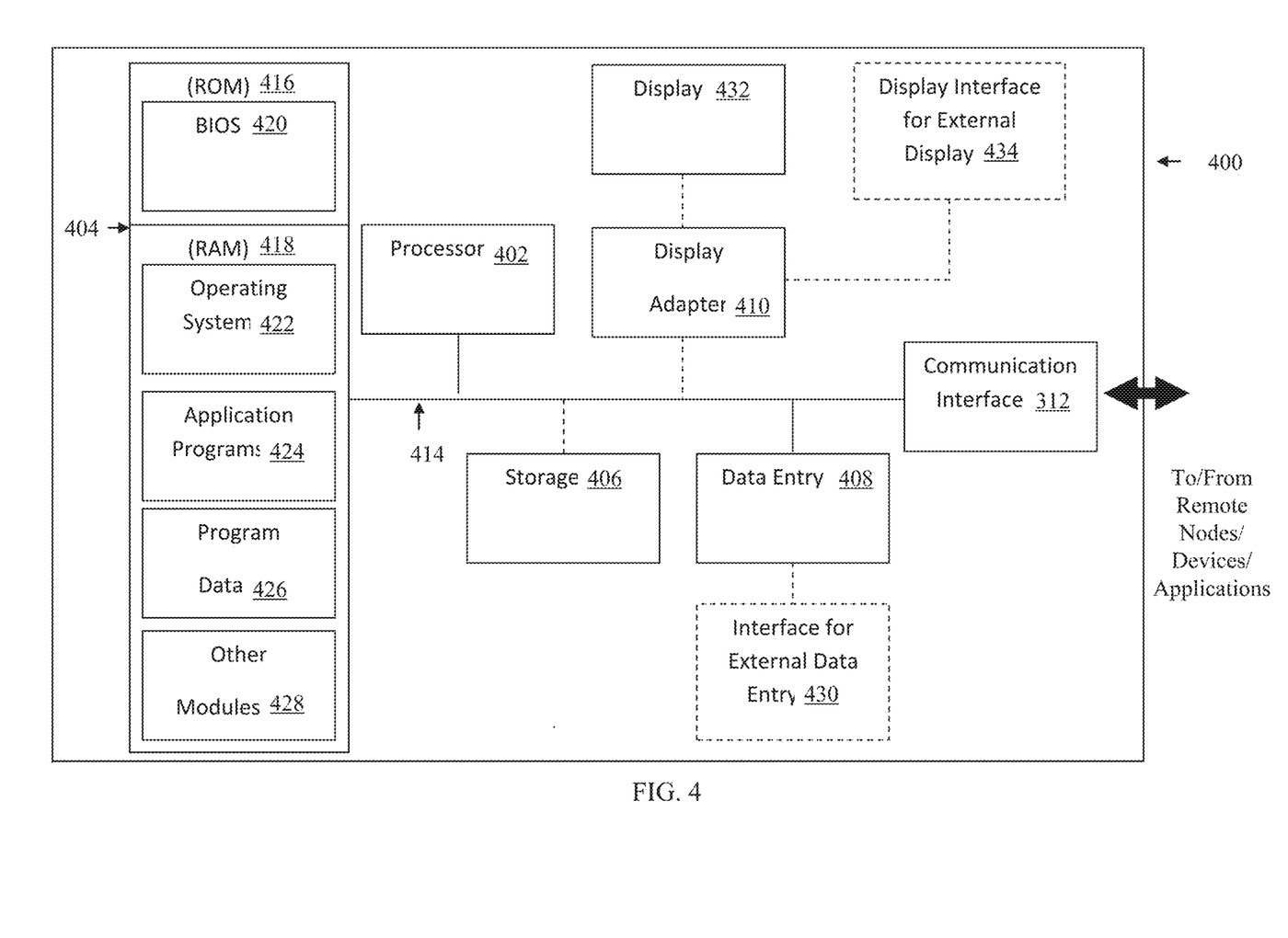
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, cause the one or more processors to:
   identify a data object, which is stored in a client, for replication;
   identify a predetermined redundancy number associated with the client, the redundancy number being a number of failed storage nodes that the data object stored in the client is protected against;
   identify a total count of storage nodes available to store replicas of the data object;
   determine whether the total count of available storage nodes is at least two greater than the redundancy number;
   determine a distribution number based on the total count of storage nodes and the redundancy number by setting the distribution number as the total count of available storage nodes minus the redundancy number, in response to a determination that the total count of available storage nodes is at least two greater than the redundancy number;
   create erasure code for the data object;
   allocate the distribution number of sections of a replica of the data object to a corresponding distribution number of available storage nodes; and
   allocate the redundancy number of sections of the erasure code to a corresponding redundancy number of available storage nodes, which excludes the corresponding distribution number of available storage nodes.

2. The system of claim 1, wherein the plurality of instructions further causes the processor to store at least the total count of replicas of the data object in the total count of available storage nodes, in response to a determination that the total count of available storage nodes is not at least two greater than the redundancy number.

3. The system of claim 1, wherein the plurality of instructions further causes the processor to store the erasure code in the client.

4. The system of claim 1, wherein a distributed ledger comprises a blockchain that stores information about transactions that have occurred and transactions that are instructed to occur.

5. The system of claim 1, wherein the plurality of instructions further causes the processor to at least one of store one of the distribution number of sections of the replica to an available storage node other than the corresponding distribution number of available storage nodes, and store one of the redundancy number of sections of the erasure code to another available storage node other than the redundancy number of available storage nodes, in response to identifying a failure associated with one available storage node of the corresponding distribution number of available storage nodes and the corresponding redundancy number of available storage nodes.

6. The system of claim 1, wherein the plurality of instructions further causes the processor to restore the data object based on accessing at least one of the corresponding distribution number of available storage nodes and the corresponding redundancy number of available storage nodes, in response to a request to restore the data object.

7. The system of claim 1, wherein at least one of allocating the distribution number of sections of the replica to the corresponding distribution number of available storage nodes, and allocating the redundancy number of sections of the erasure code to the corresponding redundancy number of available storage nodes comprise allocating chunks that comprise a section of one of the replica and the erasure code via an inter-planetary file system protocol.

8. A method comprising:
identifying a data object, which is stored in a client, for replication;
identifying a predetermined redundancy number associated with the client, the redundancy number being a number of failed storage nodes that the data object stored in the client is protected against;
identifying a total count of storage nodes available to store replicas of the data object;
determining whether the total count of available storage nodes is at least two greater than the redundancy number;
determining a distribution number based on the total count of storage nodes and the redundancy number by setting the distribution number as the total count of available storage nodes minus the redundancy number, in response to a determination that the total count of available storage nodes is at least two greater than the redundancy number;
creating erasure code for the data object;
allocating the distribution number of sections of a replica of the data object to a corresponding distribution number of available storage nodes;
and
allocating the redundancy number of sections of the erasure code to a corresponding number of available storage nodes, which excludes the corresponding distribution number of available storage nodes.

9. The computer-implemented method of claim 8, wherein the computer-implemented method further comprises storing at least the total count of replicas of the data object in the total count of available storage nodes, in response to a determination that the total count of available storage nodes is not at least two greater than the redundancy number.

10. The computer-implemented method of claim 8, wherein the computer-implemented method further comprises storing the erasure code in the client.

11. The computer-implemented method of claim 8, wherein a distributed ledger comprises a blockchain that stores information about transactions that have occurred and transactions that are instructed to occur.

12. The computer-implemented method of claim 8, wherein the computer-implemented method further comprises at least one of storing one of the distribution number of sections of the replica to an available storage node other than the corresponding distribution number of available storage nodes, and storing one of the redundancy number of sections of the erasure code to another available storage node other than the corresponding redundancy number of available storage nodes, in response to identifying a failure associated with at least one available storage node of the corresponding distribution number of available storage nodes, and the corresponding redundancy number of available storage nodes.

13. The computer-implemented method of claim 8, wherein the computer-implemented method further comprises restoring the data object based on accessing at least one of the corresponding distribution number of available storage nodes and the corresponding redundancy number of available storage node, in response to a request to restore the data object.

14. The computer-implemented method of claim 8, wherein allocating the distribution number of sections of the replica to the corresponding distribution number of available storage nodes, and allocating the redundancy number of sections of the erasure code to the corresponding redundancy number of available storage nodes comprise allocating chunks that comprise a section of one of the replica and the erasure code via an inter-planetary file system protocol.

15. A computer program product, comprising a non-transitory computer-readable medium having a computer-readable program code embodied therein to be executed by one or more processors, the program code including instructions to:
identify a data object, which is stored in a client, for replication;
identify a predetermined redundancy number associated with the client, the redundancy number being a number of failed storage nodes that the data object stored in the client is protected against;
identify a total count of storage nodes available to store replicas of the data object
determine whether the total count of available storage nodes is at least two greater than the redundancy number;
determine a distribution number based on the total count of storage nodes and the redundancy number by setting the distribution number as the total count of available storage nodes minus the redundancy number, in response to a determination that the total count of available storage nodes is at least two greater than the redundancy number;
create erasure code for the data object;
allocate the distribution number of sections of a replica of the data object to a corresponding at distribution number of available storage nodes; and
allocate the redundancy number of sections of the erasure code to a corresponding number of available storage nodes, which excludes the corresponding distribution number of available storage nodes.

16. The computer program product of claim 15, wherein the program code includes further instructions to store at least the total count of replicas of the data object in the total count of available storage nodes, in response to a determination that the total count of available storage nodes is not at least two greater than the redundancy number.

17. The computer program product of claim 15, wherein the program code includes further instructions to store the erasure code in the client.

18. The computer program product of claim 15, wherein a distributed ledger comprises a blockchain that stores information about transactions that have occurred and transactions that are instructed to occur.

19. The computer program product of claim 15, wherein the program code includes further instructions to at least one of store one of the distribution number of sections of the replica to an available storage node other than the corresponding distribution number of available storage nodes, and store one of the redundancy number of sections of the erasure code to another available storage node other than the corresponding redundancy number of available storage nodes, in response to identifying a failure associated with at least one available storage node of the corresponding distribution number of available storage nodes, and the corresponding redundancy number of available storage nodes.

20. The computer program product of claim 15, wherein the program code includes further instructions to restore the data object based on accessing at least one of the corresponding distribution number of available storage nodes and the corresponding redundancy number of available storage nodes, in response to a request to restore the data object.

\* \* \* \* \*